April 3, 1956 — W. T. SCHOLZ — 2,740,659
GLARE SHIELDING DEVICE FOR ATTACHMENT TO A SUN VISOR
Filed Feb. 13, 1952
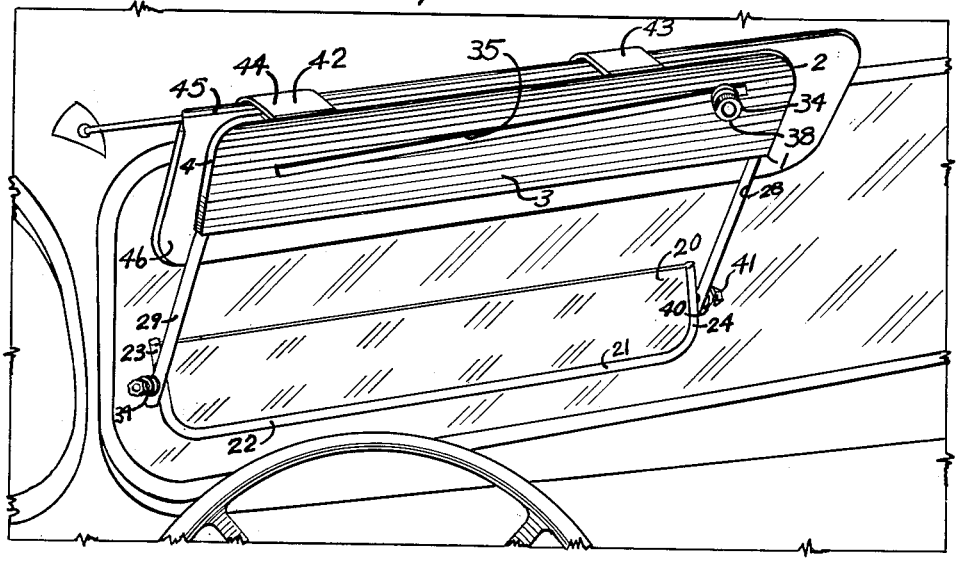
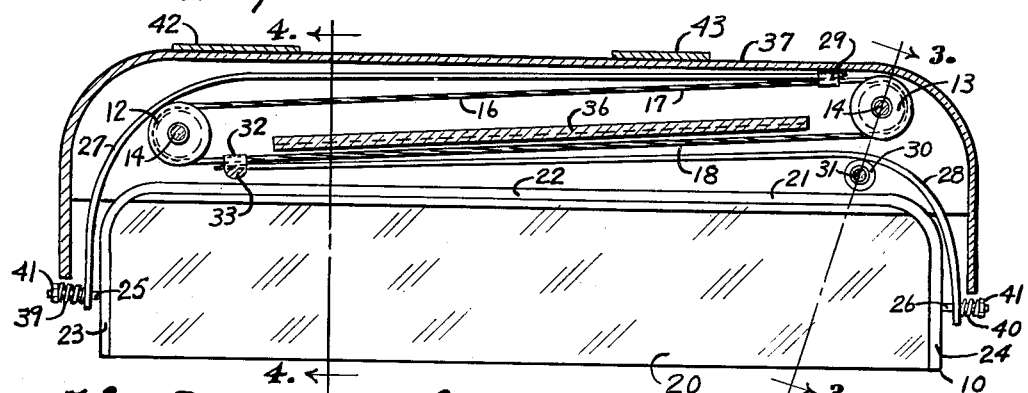
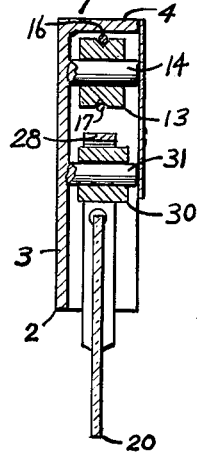
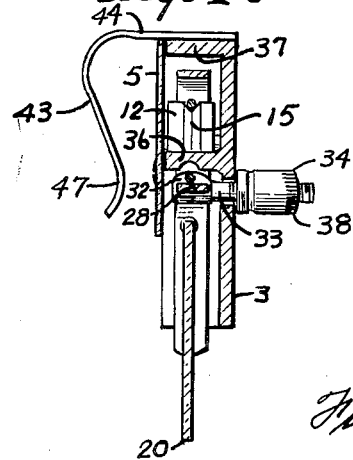
INVENTOR.
Walter T. Scholz.
BY
Fishburn & Mullendore
ATTORNEYS.

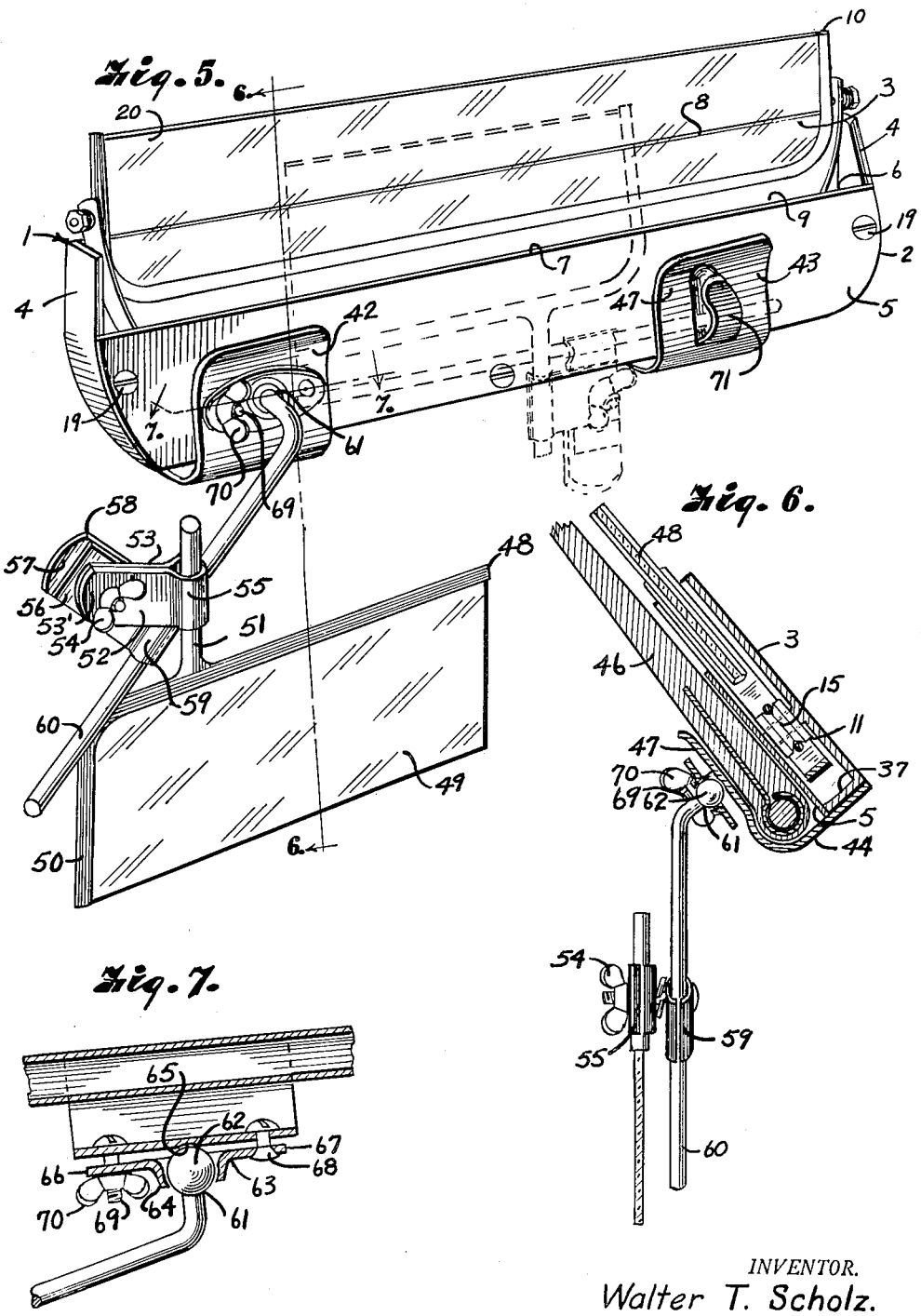

United States Patent Office 2,740,659
Patented Apr. 3, 1956

2,740,659

GLARE SHIELDING DEVICE FOR ATTACHMENT TO A SUN VISOR

Walter T. Scholz, Topeka, Kans.

Application February 13, 1952, Serial No. 271,323

4 Claims. (Cl. 296—97)

This invention relates to glare shielding devices particularly adapted for attachment to the sunshade of a motor vehicle for protecting the eyes of the driver, the principal object being to provide a device of this character that is readily applied to a sunshade and which is movable with the sunshade to a position for presenting a shield adapted for protecting the eyes of the driver from the blinding effects of the headlights of approaching vehicles and to another position for presenting a shield for protecting the eyes of the driver from the sun's rays and particularly the sun's rays reflected from the hood areas of a motor vehicle.

Other objects of the invention are to provide a glare shield structure which is of simple, light weight construction; to provide glare shields that are easily manipulated and adjusted by the driver without distracting his attention from the roadway; and to provied a device wherein the shields retain their fixed adjusted and retracted positions.

In accomplishing these and other objects of the invention as hereinafter described, I have provided improved structure, the preferred form of which is illustrated in the accompanying drawings wherein:

Fig. 1 is a perspective view of a portion of the interior of a motor vehicle having a conventional sunshade equipped with a glare protection device constructed in accordance with the present invention and showing the sunshade in position presenting the glare shield for protection of the driver's eyes from reflected light while the sunshade is affording protection from direct rays.

Fig. 2 is a longitudinal section through the casing of the device and showing the reflected light shield in retracted position.

Fig. 3 is a cross section on the line 3—3 of Fig. 2.

Fig. 4 is a cross section on the line 4—4 of Fig. 2.

Fig. 5 is a perspective view of the device as it appears when removed from the sunshade and particularly showing the shield for protecting the driver's eyes from blinding effects from the headlights of approaching vehicles, the shield being shown in full lines when it is in adjusted position and in dotted lines when in retracted position.

Fig. 6 is an enlarged section on the line 6—6 of Fig. 5.

Fig. 7 is a fragmentary section on the line 7—7 of Fig. 5, particularly illustrating the clamp for retaining the headlight glare shield supporting arm in an adjusted position.

Referring more in detail to the drawings:

1 designates a glare shielding device constructed in accordance with the present invention and which includes a substantially flat elongated casing 2. The casing 2 comprises a side wall 3 having a flange 4 extending laterally from the ends and along one edge thereof to cooperate with a removable plate 5 in forming a compartment 6.

The plate 5 is of narrower width than the side wall 3 and the free edge 7 thereof extends in spaced parallel relation with a free edge 8 of the side wall to provide the opening 9 which forms the open side of the casing and from which a glare shield 10 is projected and retracted by means of an actuating mechanism 11.

The projecting and retracting mechanism 11 includes pulleys 12 and 13 located respectively within opposite ends of the compartment 6 and rotatably mounted on spindles 14 carried by and projecting from the inner face of the side wall 3. The pulleys 12 and 13 are shown with grooved peripheries 15 for carrying a small, endless cable 16 to provide spaced runs 17 and 18 extending substantially parallel with the opening 9. The pulleys are retained on the spindles 14 by the plate 5 when the plate is secured to the flange 4 by fastening devices such as screws 19.

The shield 10 comprises an elongated transparent panle 20 that is formed of material capable of intercepting reflected light rays. The panel 20 is carried in a frame 21 extending along one side as at 22 and across the ends thereof as at 23 and 24, Figs. 1, 2 and 5. The shield 10 is supported in a retracted position with the frame side thereof slightly extended into the compartment 6. Fixed to the ends 23 and 24 of the frame are trunnions 25 and 26 that are journalled in the ends of resilient tapes 27 and 28 of the type that assume a rigid form when straight but which may be rolled or curved.

The other ends of the tapes extend into the compartment 6 of the casing, with the tape 27 extending in guided relation over the pulley 12 and along the cable 16 for attachment thereto by means of a clip 29 as shown in Fig. 2. The corresponding end of the other tape 28 extends over a guide roller 30 that is mounted on a spindle 31 at a point below the pulley 13 as shown in Figs. 2 and 3. The free end of the tape 28 extends along the lower run 18 and is attached thereto adjacent the pulley 12 by means of a clip 32 that is fixed to the stem 33 of a slide 34. The stem 33 of the slide is movable within a slot 35 that is provided in the wall portion 3 of the casing and which extends longitudinally thereof in substantially registering alignment with the lower run 18 of the cable. The lower run of the cable is kept in guided relation with the pulleys by means of a rib 36 that projects inwardly from the side wall 3 of the casing as shown in Figs. 2 and 4.

The clip 29 is similarly guided by the longitudinal portion 37 of the flange 4, also shown in Fig. 2. The stem 33 projects through the slot 35 and carries a knob 38 by which the slide may be shifted along the slot to move the upper and lower runs of the cable over the pulleys 12 and 13 and thereby effect projection of the tapes to extend the glare shield from the casing as best shown in Fig. 1.

In order that the glare shield may be retained at a fixed angle relatively to the supporting tapes, the trunnions carry coil springs 39 and 40 that are sleeved thereon and which are retained in frictional contact with the tapes by means of nuts 41 that are threaded onto the outer ends of the trunnions as shown in Fig. 2. With this arrangement the shield may be pivoted on the axis of the trunnions and retained at any adjusted angle suitable for protecting the eyes of the driver from light reflected from the hood and forward portions of the motor vehicle.

The casing of the device is equipped along the side flange 37 with spaced clips 42 and 43 having portions 44 adapted to extend across the pivotal edge 45 of a sunshade 46 and clamping portions 47 which cooperate with the side of the casing in frictionally securing the device to the sunshade as shown in Figs. 1 and 6.

The device also includes a glare shield 48 which comprises a substantially smaller rectangular transparent panel 49 that is constructed of a material to cut off the glaring rays of the headlights of an approaching vehicle. The panel 49 is contained in an angular frame 50 having a stem 51 projecting therefrom by which the shield may be supported by a clamp bracket 52.

The clamp bracket 52 includes plates 53 and 53' having jaw portions 55 for clamping the stem 51. The plate portions 53 and 53' are secured to similar plate portions 56 and 57 of a similar clamp bracket 58 by a bolt and wing nut 54. The plate portions of the clamp bracket 58 also have jaw portions 59 that engage an arm 60 that is carried by one of the clips 42. The arm 60 is preferably formed of a rod of circular cross section and has a laterally extending end 61 terminating in a ball 62 which is secured to the clip by means of a clamping plate 63. The plate 63 has a socket portion 64 that cooperates with a depression 65 in the clip to swivelly and adjustably carry the arm as shown in Fig. 7.

The plate 63 has laterally extending ears 66 and 67. The ears 67 are secured to the clip by a fastening device such as a rivet 68 while the ears 66 are secured by a threaded stud 69 having a wing nut 70 by which the plate is drawn against the clip for clamping the ball of the arm in adjusted position.

When the shield 48 is not in use, it is supported as shown in dotted lines in Fig. 5 with the end of the arm 60 being supported by a tongue 71 that is carried by the clip 43.

In using the device constructed as described, assuming that the shields are in retracted position with respect to the casing, the device is applied to any conventional sunshade by engaging the clips 42 and 43 over the pivoted edge of the shade as shown in Fig. 1. When thus applied, the clips cooperate with the casing to firmly grip the shade so that the shade may be moved about and turned on its pivotal edge without displacement of the casing.

Assuming that the light shield is to be used to prevent light rays that strike the forward portions of the vehicle from reflecting through the windshield into the driver's eyes, the slide 34 is moved along the slot 35 until the shield is at its desired elevation. Upon movement of the slide, the endless cable is actuated to effect movement of the tapes over their respective guide pulleys. The shield may then be adjusted to a selected angle. This is effected by swing the shield on the axis of the trunnions 25 and 26. When the shield is to be returned to retracted position, the slide is moved to the upper end of the slot which returns the shield to the position shown in Fig. 2.

When the glare shield 43 is to be used, the sunshade carrying the device is turned with its free edge upwardly so as to present that shield facing the driver. The arm 60 and clips 52 and 58 are adjusted along the arm 60 and relative to each other to give the desired lateral position of the shield. The shield is adjusted vertically by moving the stem within the clamp 52. The arm may also be adjusted to give the proper tension and the plate 63 to retain the outer end of the arm in the desired elevated position. After these adjustments are once made, they need not be changed for the particular driver. After use, the shield 48 may be swung upwardly alongside the casing as shown in dotted lines in Fig. 5 and the end of the arm 60 engaged with the tongue 71 to support the shield in an out-of-the-way position.

From the foregoing, it is obvious that I have provided an attachment for a sunshade of a motor vehicle which is readily applied and easily adjustable to position the respective shields for protecting the eyes of the driver from the blinding effects of approaching vehicles at night and to protect the eyes of the driver from the sun's rays reflected from the hood areas of the motor vehicle.

It is also obvious that the glare and reflection shields can be used together to protect the eyes of the driver from the blinding effects of reflected light passed through the glare shield. For example, when the glare shield is being used to protect the eyes of the driver, it often happens that concentrated beams are reflected from the cars ahead which are as blinding as the approaching head-lights in night driving. When this occurs the driver may reach up and pull the reflection shield into a position in registry with the glare shield after which the glare shield is adjusted at the proper angle to cut-off the reflected beam of light. The reflection shield thus cuts-off the spot of the glare that passes the reflected beam while a clear view is maintained through the glare shield. This feature of the invention is also used in blocking off direct view of the sun through the glare shield, as for an example, when the sun is low. When this occurs, the reflection shield is pulled down and adjusted relatively to the glare shield so as to cut-off the view of the sun through the glare shield.

What I claim and desire to secure by Letters Patent is:

1. A glare shielding device for attachment to the sunshade of a motor vehicle including a substantially flat elongated casing having an opening along one edge, means for attaching the casing in face contact with one side face of the shade with said opening alongside a free edge of the shade, an elongated glare shield adapted to be substantially housed within the casing, pulleys having support within opposite ends of the casing, a cable having spaced runs operating over the pulleys, tapes having ends connected with ends of the glare shield and opposite ends connected with the respective runs of the cable, said casing having a slot extending along one of said runs, and a slide connected with said run and movable along said slot to effect projection and retraction of the glare shield.

2. A glare shielding device for attachment to the sunshade of a motor vehicle including a substantially flat elongated casing having an opening along one edge, means for attaching the casing in face contact with one side face of the shade with said opening alongside a free edge of the shade, an elongated glare shield adapted to be substantially housed within the casing, pulleys having support within opposite ends of the casing, a cable having spaced runs operating over the pulleys, a guide backing one of said runs, said casing having a slot extending along said guide, a slide movable in the slot and connected with the run of said cable which is backed by said guide to actuate the cable on the pulleys when the slide is moved from one end of the slot to the other, and tapes connected with ends of the glare shield and having opposite ends connected with the respective runs of the cable to project and retract the glare shield upon actuation of the cable.

3. A glare shielding device for attachment to the sunshade of a motor vehicle including a substantially flat elongated casing having an opening along one edge, means for attaching the casing in face contact with one side face of the shade with said opening alongside a free edge of the shade, an elongated glare shield adapted to be substantially housed within the casing, pulleys having support within opposite ends of the casing, a cable having spaced runs operating over the pulleys, a guide backing one of said runs, said casing having a slot extending along said guide, a slide movable in the slot and connected with the run of said cable which is backed by said guide to actuate the cable on the pulleys when the slide is moved from one end of the slot to the other, tapes connected with ends of the glare shield, one of said tapes being guided over one of the pulleys and connected with the other run of the cable, and a guide roller in the casing for guiding the other tape along the guide, said other tape being connected with the run of the cable that is backed by said guide.

4. A glare shielding device for attachment to the sunshade of a motor vehicle including a substantially flat elongated casing having an opening along one edge, means for attaching the casing in face contact with one side face of the shade with said opening alongside a free edge of the shade, an elongated glare shield adapted to be substantially housed within the casing, trunnions projecting from opposite ends of the glare shield, flexible tapes having ends journalling the trunnions, tape projecting and retracting means in the casing, and means connecting other ends of the tapes with the projecting and retracting means for effecting projection and retraction of the glare shield.

References Cited in the file of this patent

UNITED STATES PATENTS

| | | |
|---|---|---|
| 1,353,552 | Sweet | Sept. 21, 1920 |
| 1,455,475 | Bullock | May 15, 1923 |
| 1,461,289 | Primrose | July 10, 1923 |
| 1,965,839 | Holt | July 10, 1934 |
| 2,003,248 | Chilowsky | May 28, 1935 |
| 2,134,414 | Norcross | Oct. 25, 1938 |
| 2,231,641 | Schwab | Feb. 11, 1941 |
| 2,286,935 | Schendeler | June 16, 1942 |
| 2,492,074 | Thomson | Dec. 20, 1949 |
| 2,498,966 | Sauer | Feb. 28, 1950 |

FOREIGN PATENTS

| | | |
|---|---|---|
| 644,031 | France | May 26, 1928 |